United States Patent
Francis

(10) Patent No.: US 12,384,411 B2
(45) Date of Patent: Aug. 12, 2025

(54) SYSTEMS AND METHODS FOR DISTRIBUTION-AWARE GOAL PREDICTION FOR MODULAR AUTONOMOUS VEHICLE CONTROL

(71) Applicant: Robert Bosch GmbH, Stuttgart (DE)

(72) Inventor: Jonathan Francis, Pittsburgh, PA (US)

(73) Assignee: Robert Bosch GmbH (DE)

( * ) Notice: Subject to any disclaimer, the term of this patent is extended or adjusted under 35 U.S.C. 154(b) by 267 days.

(21) Appl. No.: 17/953,397

(22) Filed: Sep. 27, 2022

(65) Prior Publication Data

US 2024/0109557 A1    Apr. 4, 2024

(51) Int. Cl.
*B60W 60/00* (2020.01)
*B60W 40/02* (2006.01)
(Continued)

(52) U.S. Cl.
CPC ........ *B60W 60/0011* (2020.02); *B60W 40/02* (2013.01); *B60W 40/114* (2013.01);
(Continued)

(58) Field of Classification Search
CPC ............. B60W 60/0011; B60W 40/02; B60W 40/114; B60W 50/0097; B60W 2420/403; B60W 2520/14; B60W 2556/10; B60W 2050/0016; G06N 3/084; G06N 3/08; G06N 20/00; G06V 20/56; G06V 10/774; G06V 10/82
See application file for complete search history.

(56) References Cited

U.S. PATENT DOCUMENTS

2013/0289824 A1*  10/2013  Mudalige ............... G08G 1/167
                                                             701/1
2014/0012469 A1*   1/2014  Kunihiro ............. B60W 40/072
                                                             701/41
(Continued)

OTHER PUBLICATIONS

Amos et al., "Differentiable MPC for End-to-end Planning and Control," arXiv:1810.13400v1, 2018, 15 pages.
(Continued)

*Primary Examiner* — Adam R Mott
*Assistant Examiner* — Sagar Kc
(74) *Attorney, Agent, or Firm* — Dickinson Wright PLLC

(57) ABSTRACT

A method includes generating, using a machine learning model and at a first time interval, a first current vehicle position prediction and generating, using the machine learning model, at a second time interval, a first historical vehicle trajectory prediction based on at least the first current vehicle position prediction and previous spatial information. The method also includes generating, using the machine learning model, at a third time interval, a first future vehicle position prediction based on the first current vehicle position prediction and the first historical vehicle trajectory predication. The method also includes receiving, at the first time interval, sensor data and a sequence of waypoints, and controlling, at the first time interval, at least one vehicle operation of the vehicle using the first current vehicle position prediction, the first historical vehicle trajectory prediction, the first future vehicle position prediction, the sensor data, and the sequence of waypoints.

13 Claims, 10 Drawing Sheets

(51) Int. Cl.
B60W 40/114 (2012.01)
B60W 50/00 (2006.01)
G06N 3/084 (2023.01)
G06V 20/56 (2022.01)

(52) U.S. Cl.
CPC ......... *B60W 50/0097* (2013.01); *G06N 3/084* (2013.01); *G06V 20/56* (2022.01); *B60W 2420/403* (2013.01); *B60W 2520/14* (2013.01); *B60W 2556/10* (2020.02)

(56) References Cited

U.S. PATENT DOCUMENTS

| | | | | |
|---|---|---|---|---|
| 2017/0329328 | A1* | 11/2017 | Horita | G08G 1/16 |
| 2021/0276595 | A1* | 9/2021 | Casas | G06V 30/19173 |
| 2021/0370972 | A1* | 12/2021 | Bagschik | G06F 30/27 |
| 2022/0048503 | A1* | 2/2022 | Khandelwal | B60W 30/0956 |
| 2022/0097522 | A1* | 3/2022 | Jung | B60K 35/00 |
| 2022/0315047 | A1* | 10/2022 | Probst | B60W 30/16 |
| 2023/0082365 | A1* | 3/2023 | Shiarlis | G05B 13/027 701/27 |

OTHER PUBLICATIONS

Bansal et al., "ChauffeurNet: Learning to Drive by Imitating the Best and Synthesizing the Worst," Robotics: Science and Systems, 2019, 10 pages.
Bojarski et al., "End to End Learning for Self-Driving Cars," arXiv:1604.07316v1, 2016, 9 pages.
Chen et al., "Learning by Cheating," 3rd Conference on Robot Learning (CoRL), 2019, 10 pages.
Chen et al., "Learning Exploration Policies For Navigation," arXiv:1903.01959v1, 2019, 14 pages.
Chen et al., "Learning To Set Waypoints For Audio-Visual Navigation," arXiv:2008.09622v2, 2020, 16 pages.
Codevilla et al., "Exploring the Limitations of Behavior Cloning for Autonomous Driving," Proceedings of the IEEE/CVF International Conference on Computer Vision, 2019, 10 pages.
Codevilla et al., "End-to-end Driving via Conditional Imitation Learning," arXiv:1710.02410v2, 2018, 8 pages.
Dosovitskiy et al., "CARLA: An Open Urban Driving Simulator," 1st Conference on Robot Learning (CoRL), 2017, 16 pages.
Filos et al., "Can Autonomous Vehicles Identify, Recover From, and Adapt to Distribution Shifts?" Proceedings of the 37th International Conference on Machine Learning, PMLR 119, 2020, 9 pages.
Francis et al., "Core Challenges in Embodied Vision-Language Planning." arXiv:2106.13948v2, 2021, 52 pages.
Herman et al., "Learn-to-Race: A Multimodal Control Environment for Autonomous Racing," Proceedings of the IEEE/CVF International Conference on Computer Vision, 2021, 10 pages.
Kabzan et al., "Learning-based Model Predictive Control for Autonomous Racing," IEEE Robotics and Automation Letters, vol. 4, No. 4, 2019, 9 pages.
Kingma et al., "Auto-Encoding Variational Bayes," arXiv:1312.6114v1, 2013, 9 pages.
Kingma et al., "Glow: Generative Flow with Invertible 1x1 Convolutions," arXiv:1807.03039v2, 2018, 15 pages.
Kong et al., "Kinematic and Dynamic Vehicle Models for Autonomous Driving Control Design," IEEE Intelligent Vehicles Symposium (IV), 2015, 7 pages.
Lecun et al., "Off-Road Obstacle Avoidance through End-to-End Learning," Advances in Neural Information Processing Systems 18, 2005, 9 pages.
Li et al., "Iterative Linear Quadratic Regulator Design for Nonlinear Biological Movement Systems," Proceedings of 1st International Conference on Informatics in Control, Automation and Robotics, 2004, 9 pages.
Liao et al., "Jacobian Determinant of Normalizing Flows," arXiv:2102.06539v2, 2021, 14 pages.
Milnor, "Topology From The Differentiable Viewpoint," The University Press of Virginia, 1965, 77 pages.
Ohn-Bar et al., "Learning Situational Driving," Proceedings of the IEEE/CVF Conference on Computer Vision and Pattern Recognition, 2020, 10 pages.
Pan et al., "Agile Off-Road Autonomous Driving Using End-to-End Deep Imitation Learning," arXiv:1709.07174v1, 2017, 8 pages.
Papamakarios et al., "Masked Autoregressive Flow for Density Estimation," arXiv:1705.07057v1, 2017, 17 pages.
Papamakarios et al., "Normalizing Flows for Probabilistic Modeling and Inference," Journal of Machine Learning Research, vol. 22, 2021, 64 pages.
Park et al., "Diverse and Admissible Trajectory Forecasting Through Multimodal Context Understanding," European Conference on Computer Vision—ECCV, 2020, 22 pages.
Pim De Haan et al., "Causal Confusion in Imitation Learning," 33rd Conference on Neural Information Processing Systems (NeuriPS 2019), 12 pages.
Pomerleau et al., "ALVINN: An Autonomous Land Vehicle In A Neural Network," Carnegie-Mellon University Artificial Intelligence and Psychology Project, 1989, 9 pages.
Rezende et al., "Variational Inference with Normalizing Flows," Proceedings of the 32nd International Conference on Machine Learning, 2015, 9 pages.
Rhinehart et al., "Deep Imitative Models for Flexible Inference, Planning, and Control," arXiv:1810.06544v2, 2019, 10 pages.
Rhinehart et al., "PRECOG: PREdiction Conditioned On Goals in Visual Multi-Agent Settings," Proceedings of the IEEE/CVF International Conference on Computer Vision, 2019, 10 pages.
Rhinehart et al., "R2P2: A ReparameteRized Pushforward Policy for Diverse, Precise Generative Path Forecasting," Proceedings of the European Conference on Computer Vision (ECCV), 2018, 17 pages.
Roddick et al., "Orthographic Feature Transform for Monocular 3D Object Detection," arXiv:1811.08188v1, 2018, 10 pages.
Sauer et al., "Conditional Affordance Learning for Driving in Urban Environments," 2nd Conference on Robot Learning (CoRL 2018), 16 pages.
Silver et al., "Learning from Demonstration for Autonomous Navigation in Complex Unstructured Terrain," The International Journal of Robotics Research, vol. 29, No. 12, 2010, 32 pages.
Tabak et al., "Density Estimation By Dual Ascent Of The Log-Likellhood," Communications in Mathematical Sciences, vol. 8, No. 1, 2010, 17 pages.
Thrun et al., "Stanley: The Robot that Won the DARPA Grand Challenge," Journal of Field Robotics, vol. 23, No. 9, 2006, 32 pages.
Vaswani et al., "Attention Is All You Need," 31st Conference on Neural Information Processing Systems (NIPS 2017), 11 pages.
Lee et al., "DESIRE: Distant Future Prediction in Dynamic Scenes with Interacting Agents," Proceedings of the IEEE Conference on Computer Vision and Pattern Recognition, 2017, 10 pages.
Verlet et al., "Computer 'Experiments' on Classical Fluids. I. Thermodynamical Properties of Lennard-Jones Molecules," Physical Review, vol. 159, No. 1, 1967, 6 pages.

* cited by examiner

SYSTEMS AND METHODS FOR DISTRIBUTION-AWARE GOAL PREDICTION FOR MODULAR AUTONOMOUS VEHICLE CONTROL

TECHNICAL FIELD

The present disclosure relates to the autonomous vehicle control, and in particular to systems and methods for distribution-aware goal prediction for module autonomous vehicle control.

BACKGROUND

Vehicles, such as cars, trucks, sport utility vehicles, crossovers, mini-vans, or other suitable vehicles include a propulsion system, a braking system, a steering system, and the like. Such vehicle systems may be manual controlled (e.g., by a vehicle operator) and/or autonomously or semi-autonomously controlled (e.g., by one or more autonomous or semi-autonomous vehicle controller). Increasingly, such autonomous or semi-autonomously vehicle controllers rely on or us various machine learning models for vehicle control decision making. Such machine learning models are trained and rely on relatively large training data sets, which may be generated using large amounts of expert demonstrations or other suitable data or information.

SUMMARY

An aspect of the disclosed embodiments includes a method for autonomous vehicle control. The method includes generating, using a machine learning model and at a first time interval, a first current vehicle position prediction based on current spatial position information and a first yaw value of a vehicle. The method also includes generating, using the machine learning model, at a second time interval previous to the first time interval, a first historical vehicle trajectory prediction based on at least the first current vehicle position prediction of the vehicle and previous spatial information. The method also includes generating, using the machine learning model, at a third time interval subsequent to the first time interval, a first future vehicle position prediction based on the first current vehicle position prediction and the first historical vehicle trajectory predication. The method also includes receiving, at the first time interval, sensor data from at least one sensor of the vehicle and a sequence of waypoints, and controlling, at the first time interval, at least one vehicle operation of the vehicle using the first current vehicle position prediction, the first historical vehicle trajectory prediction, the first future vehicle position prediction, the sensor data, and the sequence of waypoints.

Another aspect of the disclosed embodiments includes a system for autonomous vehicle control. The system includes a processor and a memory. The memory includes instructions that, when executed by the processor, cause the processor to: generate, using a machine learning model and at a first time interval, a first current vehicle position prediction based on current spatial position information and a first yaw value of a vehicle; generate, using the machine learning model, at a second time interval previous to the first time interval, a first historical vehicle trajectory prediction based on at least the first current vehicle position prediction of the vehicle and previous spatial information; generate, using the machine learning model, at a third time interval subsequent to the first time interval, a first future vehicle position prediction based on the first current vehicle position prediction and the first historical vehicle trajectory predication; receive, at the first time interval, sensor data from at least one sensor of the vehicle and a sequence of waypoints; and generate, at the first time interval, at least one vehicle operation command for controlling at least one vehicle operation of the vehicle, wherein the at least one vehicle operation command is generated based on the first current vehicle position prediction, the first historical vehicle trajectory prediction, the first future vehicle position prediction, the sensor data, and the sequence of waypoints.

Another aspect of the disclosed embodiments includes an apparatus for modular machine learning decision making. The apparatus includes a processor and a memory including instructions that, when executed by the processor, cause the processor to: generate, using a machine learning model and at a first time interval, a first current position prediction of an autonomously controlled machine based on at least current spatial position information of the autonomously controlled machine; generate, using the machine learning model, at a second time interval previous to the first time interval, a first historical trajectory prediction of the autonomously controlled machine based on at least the first current position prediction and previous spatial information; generate, using the machine learning model, at a third time interval subsequent to the first time interval, a first future position prediction of the autonomously controlled machine based on the first current position prediction and the first historical trajectory predication; receive, at the first time interval, sensor data from at least one sensor of the autonomously controlled machine and a sequence of waypoints; and generate, at the first time interval, at least one operation command for controlling at least one operation of the autonomously controlled machine, wherein the at least one operation command is generated based on the first current position prediction, the first historical trajectory prediction, the first future position prediction, the sensor data, and the sequence of waypoints.

DETAILED DESCRIPTION

Figure 1:
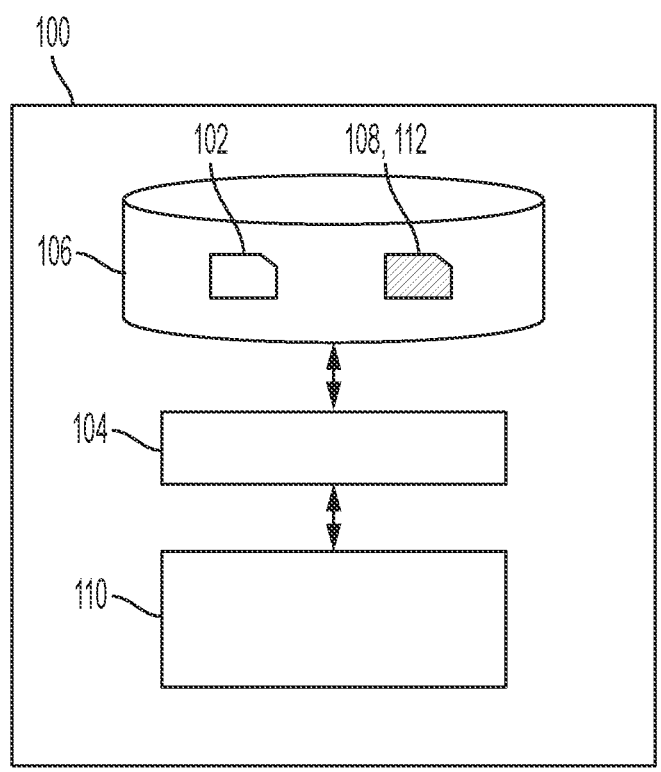
FIG. 1 generally illustrates a system for training a neural network, according to the principles of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As described, vehicles, such as cars, trucks, sport utility vehicles, crossovers, mini-vans, or other suitable vehicles include a propulsion system, a braking system, a steering system, and the like. Such vehicle systems may be manual controlled (e.g., by a vehicle operator) and/or autonomously or semi-autonomously controlled (e.g., by one or more autonomous or semi-autonomous vehicle controller). Increasingly, such autonomous or semi-autonomously vehicle controllers rely on or us various machine learning models for vehicle control decision making. Such machine learning models are trained and rely on relatively large training data sets, which may be generated using large amounts of expert demonstrations or other suitable data or information.

The feasibility of collecting such large amounts of expert demonstrations has inspired growing research interests in learning-to-drive settings, where models learn by imitating the driving behaviour from experts. However, exclusively relying on imitation can limit generalisability of the machine learning model to novel scenarios that are outside the support of the training data.

Accordingly, systems and methods, such as those described herein, configured to, decompose vehicle operating tasks into modular skill primitives (e.g., which may be generalizable and more robust to changes in the environment), may be desirable. In some embodiments, the systems and methods described herein may be configured to reformulate the learning-to-drive task as goal distribution prediction, model-based planning, and trajectory pruning. The systems and methods described herein may be configured to learn a multi-mode goal distribution by imitating the expert conditioned on reaching the target location. The systems and methods described herein may be configured to ground candidate trajectory predictions on vehicle kinematics and road geometry. The systems and methods described herein may be configured to, at each time step, sample multiple goals and at the same time or substantially the same time prune the predictions that are spurious.

Achieving generalisability to novel scenarios in urban autonomous driving remains a challenging task for artificial intelligence (AI). Recent approaches have shown promising results in end-to-end imitation learning from expert demonstrations, wherein agents (e.g., which may include or be referred to herein as vehicle controllers, autonomous vehicle controllers, semi-autonomous vehicle controllers, machine controllers, autonomous machine controllers, semi-autonomous machine controllers, and the like) learn policies that replicate expert actions, at each time-step, given the corresponding observations. Despite this progress, end-to-end imitative models often cannot capture the causal structures that underlie expert-environment interactions, leading models to misidentify the correct mappings from the observations. Furthermore, if the coverage of expert demonstrations does not extend to all scenarios that the agent will encounter during test time, the agent will generate spurious actions in response to these out-of-distribution (OOD) observations.

In some embodiments, the systems and methods described herein may be configured to decompose learning into sub-modules (e.g., or sub-tasks), for trajectory forecasting, indoor robot navigation, learnable robot exploration, other suitable learning applications, or a combination thereof. The systems and methods described herein may be configured to, break down the inference problem into smaller units to provide more control over the inference step to avoid causal misidentification (e.g., by using modules that need not be optimised through a data-driven process, such as proportional-integral-derivative (PID) controllers, A* path-search algorithms, etc.). The systems and methods described herein may be configured to define modules in the learning-to-drive setting, such that each module task is directly attributable to the components of behaviour expected of an expert agent. The systems and methods described herein may be configured to provide task modules with specialised roles (e.g., obstacle-awareness, explicitly modelling environmental dynamics, goal-prediction, trajectory pruning, and/or a combination thereof), improving both the tractability of their respective tasks and their complementarity towards the downstream task.

In some embodiments, the systems and methods described herein may be configured to effectively utilise the prior experience of the expert (e.g., in the form of expert demonstrations), while also achieving generalisability to novel scenarios. The systems and methods described herein may be configured to utilise expert demonstrations for pre-training sub-modules and for density estimation. The systems and methods described herein may be configured to ground predictions on a differentiable vehicle kinematics model and constrain predictions to respect road admissibility through geometrical projection of goal prediction.

Figure 3A:
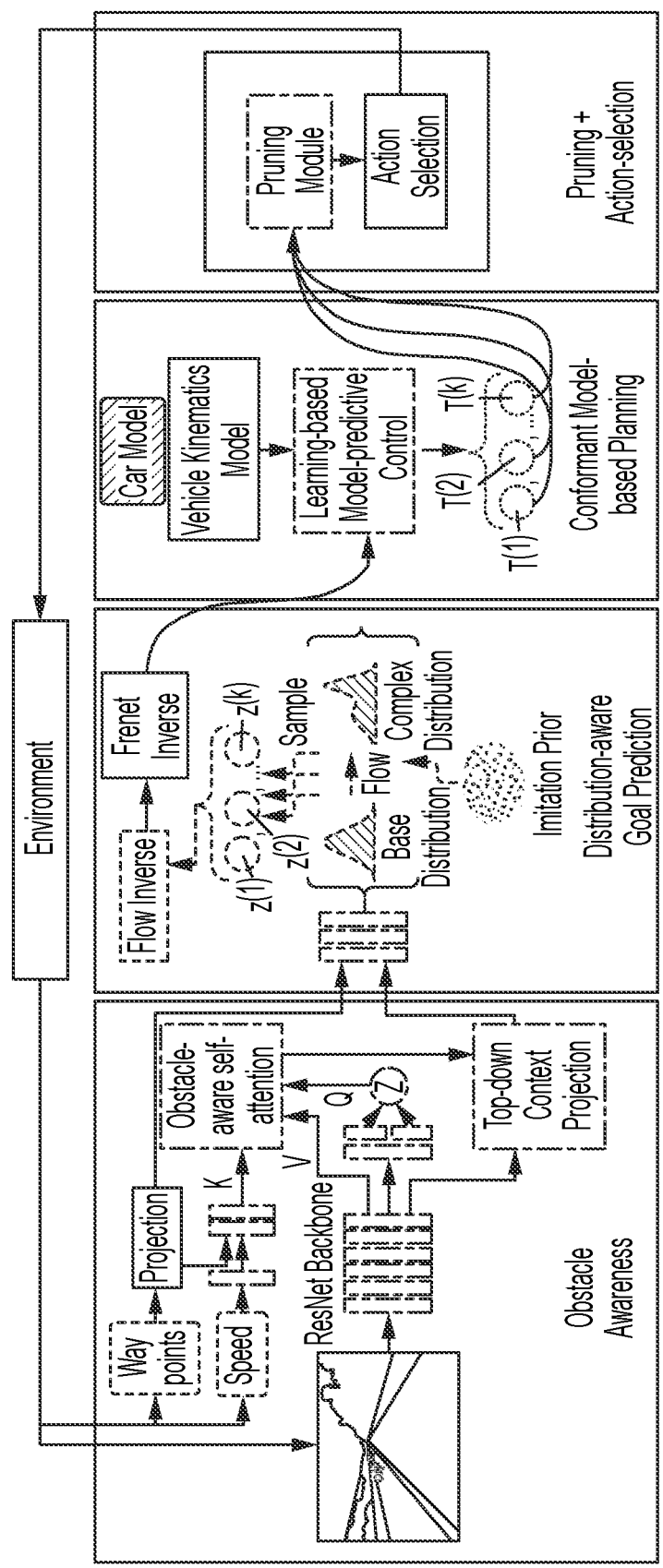
FIGS. 3A and 3B generally illustrate an autonomous vehicle control architecture, according to the principles of the present disclosure.

The systems and methods described herein may be configured to produce a framework for generating diverse multi-modal predictions, for the learning-to-drive setting, that achieves improved generalisability through modular task structures, more informed goal likelihood density-estimation, explicit grounding on differentiable vehicle kinematics for trajectory generation, and learnable trajectory-pruning through adversarial filtering and policy refinement. As is generally illustrated in FIG. 3A, the systems and methods described herein may be configured to define modular skill primitives, based on the decomposable nature of human driving behaviour. The systems and methods described herein may be configured to provide model generalisability by coupling an imitation prior objective with a goal likelihood term, enabling the agent to leverage expert knowledge, while modelling more diverse modes in the underlying distribution overall goal futures. The systems and methods described herein may be configured to ground candidate trajectories on vehicle kinematics, while learning to prune the predictions that are spurious.

As used herein, the ego-agent (e.g., or agent) includes a dynamic, on-road entity whose state is characterized by a 7-dimensional (7D) pose: a spatial position (consisting of x, y, and z in a Cartesian world coordinate frame), a speed v, and an orientation (consisting of roll, yaw, and pitch), evolving over time. For the position of the ego-agent at control time-step k, the systems and methods described herein may use the notation $S_k$=[x, y, v, yaw]∈$\mathbb{R}^4$; for the sequence of positions of the agent. From time-step $k_1$ to $k_2$, the systems and methods described herein may use $S_{k_1}:S_{k_2}$. For the full sequence of the positions of the ego-agent, for a single episode in the training data, the systems and methods described herein may use (bold) S. Setting $k_0$ as the present state, the systems and methods described herein may define the historical trajectory of the agent t≤$k_0$ to be $S_{past}$ and the future trajectory of the agent (again, from the expert demonstrations) t≥$k_0$ to be $S_{future}$. At each control time-step, k, the agent is provided with contextual information from the environment, such as a frontal camera (e.g., of the machine associated with the ego-agent) view $\Phi \in \mathbb{R}^{h \times W \times C}$ and a sequence of waypoints ω. Combining $S_{past}$, Φ, and ω, the systems and methods described herein may be configured to provide have the observation of the agent, or $\mathcal{O}=\{S_{past}, \Phi, \omega\}$ At each time-step, the agent takes an action $a_k$, defined as a tuple of braking, throttling, and steering control (e.g. or any other suitable control of the machine associated with the agent). The systems and methods described herein may be configured to learn a parameterized policy $\pi_\theta$ that maps observations to actions a~$\pi_\theta(\cdot|\mathcal{O})$, such that, given a sequence of observations, an agent that begins at some initial location in the environment can drive to some destination.

In some embodiments, the systems and methods described herein may be configured to learn decomposable skills to factorize the predictive distribution over actions, as a more tractable mapping: $\mathcal{P} \circ \mathcal{M} \ \mathcal{PC} \circ \mathcal{G} \circ \mathcal{OA}$. Here, m~$\mathcal{OA}(\cdot|\mathcal{O})$ is an obstacle-awareness module, which generates an embedding m, given an observation. $\hat{S}_{goal}$~$\mathcal{G}$ $\mathcal{P}(\cdot|\mathcal{O}, m)$ is a goal prediction module, having samples that are desired to be diverse in their coverage of the modes in the true, underlying goal prior p($S_{goal}|\mathcal{O}$). Here, $\hat{S}_{goal}$ (hat) is the predicted goal from the $\mathcal{G}$ $\mathcal{P}$ module and $S_{goal}$ is the true (unobserved) goal of the expert agent, which characterises its scene-conditioned navigational intent. The systems and methods described herein may be configured to use $\mathcal{G}$ $\mathcal{P}$ to generate multiple samples, where each sample can be regarded as an independent hypothesis of what might have happened. Given the same observation. $\hat{S}_{k+1:k+N}$, $\hat{a}_{k+1:k+N}$=$\mathcal{MPC}(\hat{S}_{k+N})$ is a learning-based controller, which takes K samples from the goal distribution as input and enumerates K navigation trajectory candidates. $\mathcal{P}$ is a pruning module that scores and selects the best trajectory, given an observation $\mathcal{O}$ and a collection of K trajectory candidates.

The systems and methods described herein may be configured to model urban driving (e.g., or other suitable driving scenario) as a composition of driving primitives, where, through decomposition of the conventional multimodal perception backbone into hierarchical units and through modular training, the systems and methods described herein may be configured to provide lower sample-complexity and improve robustness and generalisability (e.g., when compared to end-to-end policies).

Figure 3B:
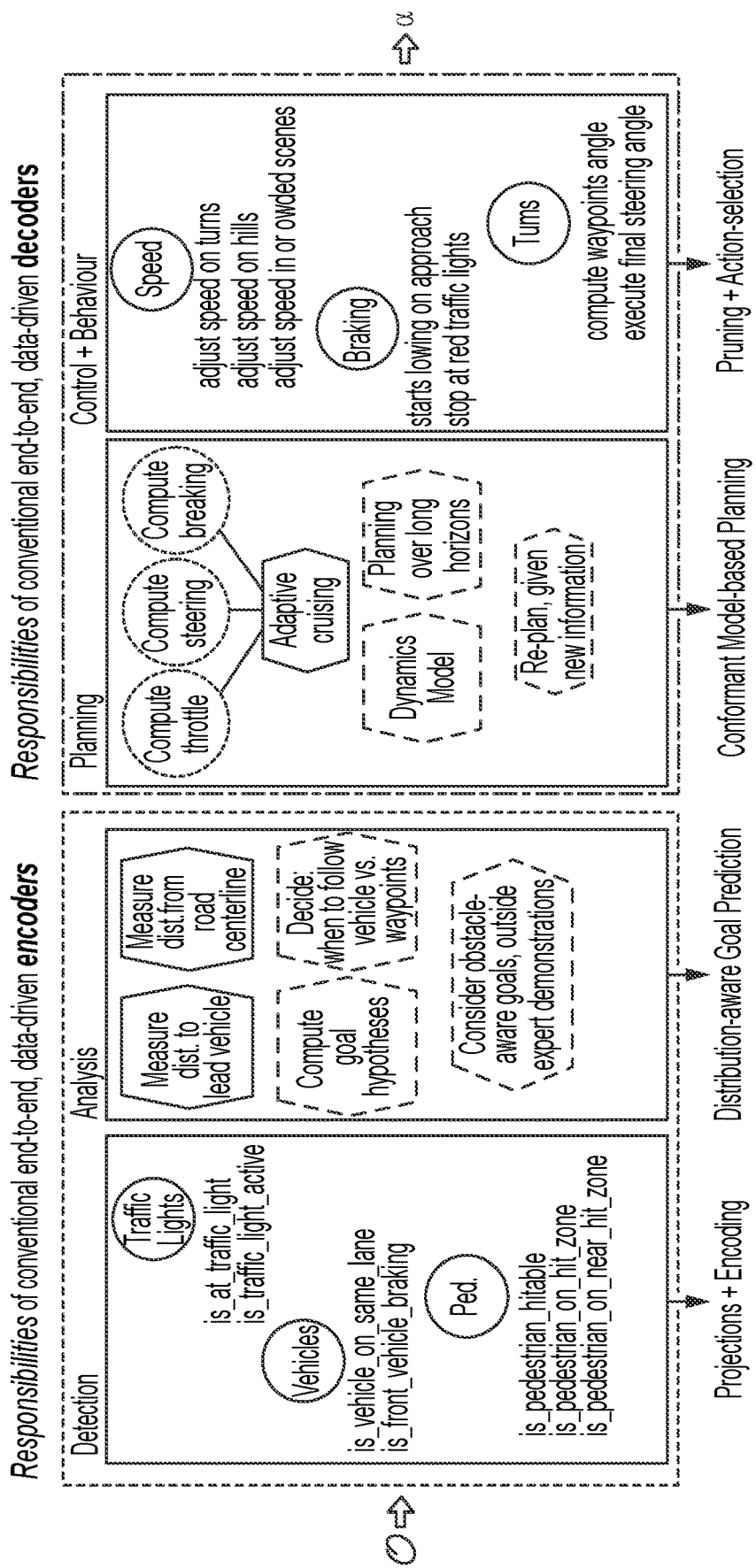

In some embodiments, the systems and methods described herein may be configured to provide a modular pipeline that models the distribution-aware goals, for prediction in urban driving settings (DGP). The systems and methods described herein may be configured to provide four components: an obstacle-awareness module, a distribution-aware goal prediction module, a conformant model-based planning module, and a trajectory pruning and action-selection module, as is generally illustrated in FIGS. 3A and 3B. The systems and methods described herein may be configured to use the ego-centric sequence of red-green-blue (RGB) images, world-frame waypoints, and current speed information (e.g., of the vehicle associated with the ego-agent) to learn obstacle-aware attention maps and top-down visual representations. These scene encodings inform the goal prediction module, which combines an imitation prior and a goal likelihood objective, in order to leverage expert experience for generalizability to novel scenarios. A set of candidate goal predictions are realized as trajectories, each transformed to the Frenet road frame coordinate system and grounded to vehicle kinematics, using a differentiable model predictive control (MPC) controller. The pruning module scores and filters trajectories, before feeding best trajectories for path-tracking.

In some embodiments, the systems and methods described herein may be configured to condition the learning of the goal distribution on crucial scene context from projected top-down feature representation and obstacle self-attention. The task of the perception module is to transform the front-view image observations into bird's eye view (BEV) semantic object attention maps.

In some embodiments, the systems and methods described herein may be configured to use an orthographic feature transform (OFT) technique that includes extracting obstacle semantic information by pre-training a variational auto-encoder to reconstruct pixels, speed, and steering control in the next time step from current observations. The systems and methods described herein may be configured to encourage the latent variables to attend to obstacle in front view (e.g., vehicles, pedestrians, traffic lights, curbs, and the like) which impact future vehicle control. The front-view feature map f(u, v) is constructed by combining the learned self-attention maps with multi-scale images features of pre-trained front-end. The systems and methods described herein may be configured to generate voxel-based features g(x, y, z) by accumulating image-based features f(u, v) to a uniformly spaced 3-dimensional (3D) lattice $\mathcal{P}$ fixed to the ground plane a distance $y_p$ below the camera and has dimensions W, H, D and a voxel resolution of r using orthogonal transformation. The top-down image feature representation h(x, z) is generated by collapsing the 3D voxel feature map along the vertical dimension through a learned 1-dimensionla (1D) convolution. In addition to image features, the systems and methods described herein may be configured to interpolate a waypoint sequence and create a top-down grid representation of waypoints with one-hot encoding. The final top-down feature representation is of dimension [W/r, D/r, C] where the number of channels C=$C_{attn}$+$C_{resnet}$+1.

In some embodiments, the systems and methods described herein may be configured to approximate the true predictive distribution over all possible goal futures of the ego-agent, $p(S_{goal}|\mathcal{O}, m)$, given an observation $\mathcal{O}$ from the environment and an embedding vector m from the obstacle awareness module. To account for the predictive intent of the expert agent not being observable from the training data (e.g., there does not exist ground-truth goal locations to use as labels for directly learning a scene-conditioned imitative prior over goals), the systems and methods described herein may be configured to use a future state of the expert agent, at fixed time horizon T, to be the "ground-truth" goal $S_{goal} \in S_{future}$, with $S_{goal} \equiv S_{k_0+N\Delta T}$ of the ego-agent, where N denotes the number of time-steps in the planning horizon.

In some embodiments, the systems and methods described herein may be configured to, rather than learning a mapping to directly imitate the derived expert goals, model an approximation $q_\theta(S_{goal}|\mathcal{O}, m)$ of the underlying goal distribution, by leveraging a bijective and differentiable mapping between a chosen base distribution $q_0$ and the target approximate goal distribution $q_\theta$ (e.g., which may be referred to as a normalizing flow, which may provide a general framework for transforming a simple probability density (base distribution) into a more expressive one, through a series of invertible mappings). The systems and methods described herein may be configured to let f be an invertible and smooth function, with $f: \mathbb{R}^d \rightarrow \mathbb{R}^d$, $x=f(z)$, $z \sim p_z$, $f^{-1}=g$, and thus $g \circ f(z)=z$, for d-dimensional random vectors x and z. Further, the systems and methods described herein may be configured to attribute to f the property of diffeomorphism, which ensures that $q_x$ remains well-defined and obtainable through a change of variables, and ensures that $p_z$ is uniformly distributed on the same domain as the data space, insofar as both f and its inverse $f^{-1}$ are differentiable and that z retains the same dimension as x:

$$q_x(x) = p_z(z)\left|\det\frac{\partial f}{\partial z}\right|^{-1} = p_z(f^{-1}(x))\left|\det\frac{\partial f^{-1}}{\partial x}\right| \quad (1)$$

The systems and methods described herein may be configured to may construct arbitrarily complex densities, by flowing z along the path created by a chain of K successive normalizing distributions $p_z(z)$, with each successive distribution governed by a diffeomorphic transformation:

$$x = z_K = f_K \circ \ldots \circ f_2 \circ f_1(z_0) \quad (2)$$

Following this sequence of transformations, the main interfaces with the flow-based model are through either sampling or evaluating its density, where, in the former, the systems and methods described herein may be configured to sample from $p_z(z)$ and compute the forward transformation f; in the latter, the systems and methods described herein may be configured to compute the inverse transformation $f^{-1}$, its Jacobian determinant, and the $p_z(z)$ density evaluation.

The systems and methods described herein may be configured to extend equation (1) to obtain a conditional normalising flow formulation, in order to incorporate additional context (e.g., this additional context is sometimes referred to as side-information) and achieve finer granularity in the density estimate of the goal distribution.

The systems and methods described herein may be configured to be respectful of physical kinematic constraints and provide a good basis for transfer to other vehicle morphologies and generalisation to unseen environments. Equation (3) summaries an MPC problem. The objective (e.g., equation 5) is to minimise the tracking error with respect to a reference trajectory, in this case the centreline of the driveable area (e.g., the road) at a pre-specified reference speed, with regularisation on actuations, over a planning horizon of T time steps. Q and R are both diagonal matrices corresponding to cost weights for tracking reference states and regularising actions. At the same time, the MPC respects the system dynamics of the vehicle (Eqn. 3b), and allowable action range (e.g., equation. 3).

$$\min_{a_{1:T}} \quad (3)$$

$$\sum_{t=1}^{T}\left[(s_t - s_{ref,i})^T Q(s_i - s_{ref,i}) + a_i^T R a_i\right]$$

s.t.

$$s_{t+1} = f(s_t, a_t),$$

$$\forall t = 1, \ldots, T$$

$$\underline{a} \leq a_t \leq \overline{a}$$

Specifically, the systems and methods described herein may be configured to characterize the vehicle with the kinematic bike model (e.g., the equations are defined with respect to the back axle of the vehicle and are used for generating expert demonstrations, and the kinematic bike model may be defined with respect to the center of the vehicle) given in equation 4, where the state is $s=[x, y, v, \phi]$, and the action is $a=[a, \sigma]$. x, y are the vehicle location in local east, north, up (ENU) coordinates, v is the vehicle speed, and $\phi$ is the yaw angle (measured anti-clockwise from the local east-axis), a is the acceleration, and $\delta$ is the steering angle at the front axle.

$$\dot{x} = v \cos(\phi)$$

$$\dot{y} = v \sin(\phi)$$

$$\dot{v} = a$$

$$\dot{\phi} = v \tan \delta / L \quad (4)$$

The objective function is given as:

$$\min_{a_{1:T}} \quad (5)$$

$$\sum_{t=1}^{T}\left[(s_t - s_{ref,i})^T Q(s_i - s_{ref,i}) + a_i^T R a_i\right]$$

Aside from L defined as the distance between the front and rear axle, the kinematic bike model expects actions (e.g., acceleration and steering, in physical units) while the environment expects commands in $[-1,1]$. For instance, acceleration command=1 results in smaller acceleration at higher speed. In the current implementation, the systems and methods described herein may be configured to make a simplifying assumption that $a=k_1 \times$acceleration command, and $\delta=k_2 \times$steering command.

The systems and methods described herein may be configured to use an iterative linear quadratic regulator (iLQR), which iteratively linearizes the non-linear dynamics (e.g., equation 2) along the current estimate of trajectory, solves a linear quadratic regulator problem based on the linearized dynamics, and repeats the process until convergence.

In some embodiments, the systems and methods described herein may be configured to provide the ego-agent with an RGB image, a waypoint sequence, and vehicle speed. The agent may produce steering, throttle, and braking control, in order to navigate to a destination. The systems and methods described herein may be configured to first train the ego-agent on provided offline expert demonstration generated using a rules-based autopilot. The systems and methods described herein may be configured to evaluation the ego-agent on various OOD navigation tasks (e.g., such as: abnormal turns, busy-town settings, hills, and roundabouts, and the like). The systems and methods described herein may be configured to measure the performance of the ego-agent according to the following metrics: success rate (percentage of successful navigations to the destination), infractions per kilometre (ratio of moving violations to kilometre driven), and total distance travelled.

In some embodiments, the systems and methods described herein may be configured to generate, using a machine learning model and at a first time interval, a first current vehicle position prediction based on current spatial position information and a first yaw value of a vehicle. The machine learning model may be initially trained using training data that includes vehicle operation data corresponding to operation of one or more vehicles (e.g., including position date, yaw data, pitch data, roll data, steering data, braking data, propulsion data, various operational commands, and/or any other suitable data associated with the operation of one or more vehicles). The systems and methods described herein may be configured to generate, using the machine learning model, at a second time interval previous to the first time interval, a first historical vehicle trajectory prediction based on at least the first current vehicle position prediction of the vehicle and previous spatial information.

The systems and methods described herein may be configured to generate, using the machine learning model, at a third time interval subsequent to the first time interval, a first future vehicle position prediction based on the first current vehicle position prediction and the first historical vehicle trajectory predication. The systems and methods described herein may be configured to receive, at the first time interval, sensor data from at least one sensor of the vehicle and a sequence of waypoints. The sensor data may include one or more images corresponding to an operating environment of the vehicle and/or any other suitable sensor data. The at least one sensor may include an image capturing device, a light detection and ranging sensor, a radio detection and ranging device, a sound navigation and ranging device, and/or any other suitable sensor or device. The systems and methods described herein may be configured to generate, at the first time interval, at least one vehicle operation command for controlling at least one vehicle operation of the vehicle, wherein the at least one vehicle operation command is generated based on the first current vehicle position prediction, the first historical vehicle trajectory prediction, the first future vehicle position prediction, the sensor data, and the sequence of waypoints.

The systems and methods described herein may be configured to update historical data (e.g., associated with operation of the vehicle and/or any other suitable vehicle) using the first current vehicle position prediction, the first historical vehicle trajectory prediction, the first future vehicle position prediction, the at least one vehicle operation command, other suitable data, or a combination thereof. The systems and methods described herein may be configured to prune the historical data based on feedback responsive to the first current vehicle position prediction, the first historical vehicle trajectory prediction, the first future vehicle position prediction, or a combination thereof. The machine learning model may be subsequently trained using the historical data.

The systems and methods described herein may be configured to receive, at the third time interval, subsequent sensor data from the at least one sensor of the vehicle and a subsequent sequence of waypoints. The systems and methods described herein may be configured to generate, using the machine learning model and at the third time interval, a second current vehicle position prediction based on subsequent spatial position information and a second yaw value of the vehicle. The systems and methods described herein may be configured to generate, using the machine learning model, at a fourth time interval previous to the third time interval, a second historical vehicle trajectory prediction based on at least the second current vehicle position prediction of the vehicle and previous spatial information. The systems and methods described herein may be configured to generate, using the machine learning model, at a fifth time interval subsequent to the third time interval, a second future vehicle position prediction based on the second current vehicle position prediction and the second historical vehicle trajectory predication. The systems and methods described herein may be configured to control, at the third time interval, the at least one vehicle operation of the vehicle using the second current vehicle position prediction, the second historical vehicle trajectory prediction, the second future vehicle position prediction, the subsequent sensor data, and the sequence of waypoints.

FIG. 1 shows a system 100 for training a neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104.

In some embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers.

The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network.

The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In some embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 2:
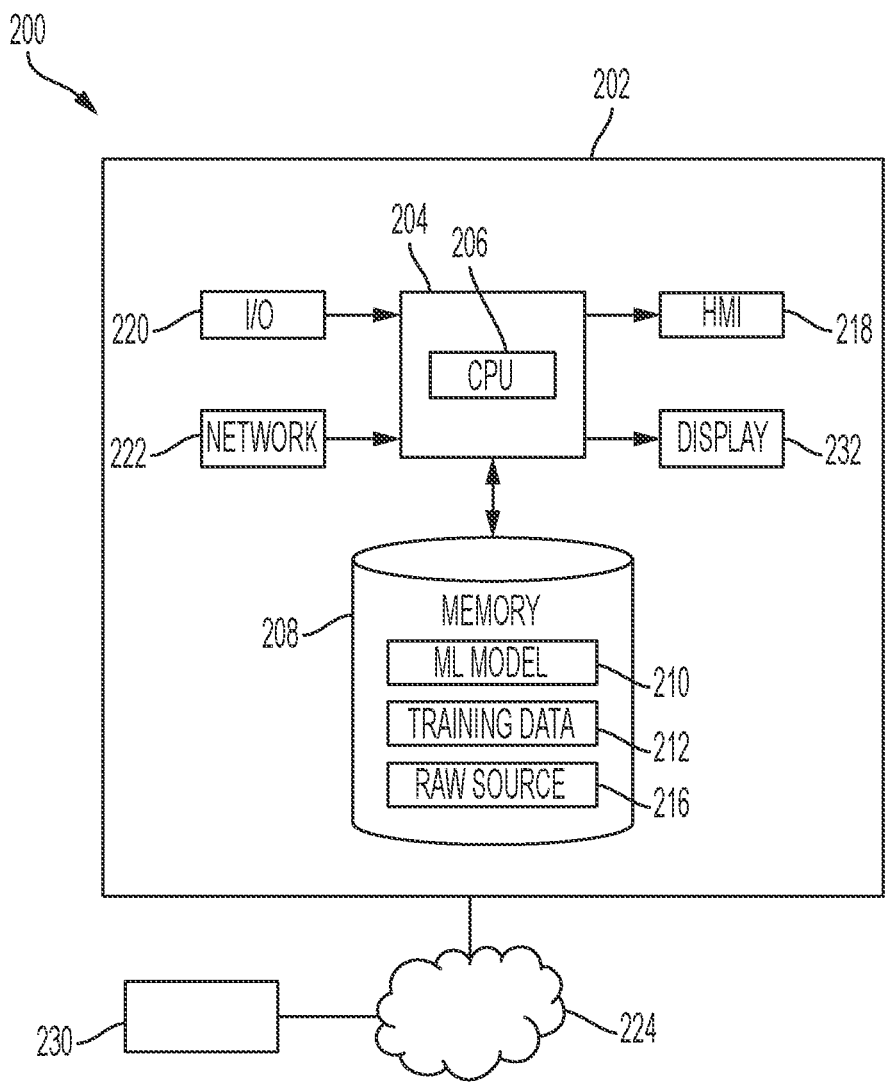
FIG. 2 generally illustrates a computer-implemented method for training and utilizing a neural network, according the principles of the present disclosure.

FIG. 2 generally illustrates a data annotation/augmentation system 200 to implement a system for vehicle control. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction stet such as one of the x86, ARM, Power, or MIPS instruction set families.

During operation, the CPU 206 may execute stored program instructions that are retrieved from the memory unit 208. The stored program instructions may include software that controls operation of the CPU 206 to perform the operation described herein. In some embodiments, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 (e.g., represented in FIG. 2 as the ML Model 210) or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 (e.g., which may be referred to herein as the machine learning model 210) that is configured to analyze the raw source dataset 216. The raw source dataset 216 may include raw or unprocessed sensor data that may be representative of an input dataset for a machine-learning system. The raw source dataset 216 may include video, video segments, images, text-based information, and raw or partially processed sensor data (e.g., radar map of objects). In some embodiments, the machine-learning algorithm 210 may be a neural network algorithm that is designed to perform a predetermined function. For example, the neural network algorithm may be configured in automotive applications to identify pedestrians in video images.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include vehicle operational data and/or any other suitable data, as described herein.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., annotations) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), the machine-learning algorithm 210 may be executed using data that is not in the training dataset 212. The trained machine-learning algorithm 210 may be applied to new datasets to provide control of one or more operations of the vehicle.

The machine-learning algorithm 210 may be configured to identify a particular feature in the raw source data 216. The raw source data 216 may include a plurality of instances or input dataset for which vehicle control commands are desired. The machine-learning algorithm 210 may be programmed to process the raw source data 216 to identify the presence of the particular features. The machine-learning algorithm 210 may be configured to predict, using the raw source data 216, one or more vehicle operation commands for controlling the vehicle. The raw source data 216 may be derived from a variety of sources. For example, the raw source data 216 may be actual input data collected by a machine-learning system. The raw source data 216 may be machine generated for testing the system.

In the example, the machine-learning algorithm 210 may process raw source data 216 and output a vehicle control prediction. The machine-learning algorithm 210 may generate a confidence level (e.g., a certainty value) or factor for each output generated. For example, a confidence value that exceeds a predetermined high-confidence threshold may indicate that the machine-learning algorithm 210 is confident that the vehicle control prediction will result in a desired vehicle control. A confidence value that is less than a low-confidence threshold may indicate that the machine-learning algorithm 210 has some uncertainty that the vehicle control prediction will result in the desired vehicle control.

In some embodiments, the system 200 may generate, using a machine learning model (e.g., such as the machine learning model 210, one or more other suitable machine learning models, or a combination thereof) and at a first time interval, a first current vehicle position prediction based on current spatial position information and a first yaw value of a vehicle. The machine learning model 210 may be initially trained using training data that includes vehicle operation data corresponding to operation of one or more vehicles (e.g., including position date, yaw data, pitch data, roll data, steering data, braking data, propulsion data, various operational commands, and/or any other suitable data associated with the operation of one or more vehicles).

The system 200 may generate, using the machine learning model 210, at a second time interval previous to the first time interval, a first historical vehicle trajectory prediction based on at least the first current vehicle position prediction of the vehicle and previous spatial information. The system 200 may generate, using the machine learning model 210, at a third time interval subsequent to the first time interval, a first future vehicle position prediction based on the first current vehicle position prediction and the first historical vehicle trajectory predication. The system 200 may receive, at the first time interval, sensor data from at least one sensor of the vehicle and a sequence of waypoints. The sensor data may include one or more images corresponding to an operating environment of the vehicle and/or any other suitable sensor data. The at least one sensor may include an image capturing device, a light detection and ranging sensor, a radio detection and ranging device, a sound navigation and ranging device, and/or any other suitable sensor or device. The system 200 may generate, at the first time interval, at least one vehicle operation command for controlling at least one vehicle operation of the vehicle. The at least one vehicle operation command may be generated based on the first current vehicle position prediction, the first historical vehicle trajectory prediction, the first future vehicle position prediction, the sensor data, and the sequence of waypoints.

The system 200 may update historical data (e.g., associated with operation of the vehicle and/or any other suitable vehicle) using the first current vehicle position prediction, the first historical vehicle trajectory prediction, the first future vehicle position prediction, the at least one vehicle operation command, other suitable data, or a combination thereof. The system 200 may prune the historical data based on feedback responsive to the first current vehicle position prediction, the first historical vehicle trajectory prediction, the first future vehicle position prediction, or a combination thereof. The machine learning model 210 may be subsequently trained using the historical data.

The system 200 may receive, at the third time interval, subsequent sensor data from the at least one sensor of the vehicle and a subsequent sequence of waypoints. The system 200 may generate, using the machine learning model and at the third time interval, a second current vehicle position prediction based on subsequent spatial position information and a second yaw value of the vehicle. The system 200 may generate, using the machine learning model 210, at a fourth time interval previous to the third time interval, a second historical vehicle trajectory prediction based on at least the second current vehicle position prediction of the vehicle and previous spatial information. The system 200 may generate, using the machine learning model 210, at a fifth time interval subsequent to the third time interval, a second future vehicle position prediction based on the second current vehicle position prediction and the second historical vehicle trajectory predication. The system 200 may control, at the third time interval, the at least one vehicle operation of the vehicle using the second current vehicle position prediction, the second historical vehicle trajectory prediction, the second future vehicle position prediction, the subsequent sensor data, and the sequence of waypoints.

While the systems and methods described herein are described as controlling one or more aspects of vehicle operation, it should be understood that the systems and methods described herein may be configured to perform any suitable function, such as those described herein with respect to FIGS. 6-11.

Figure 4:
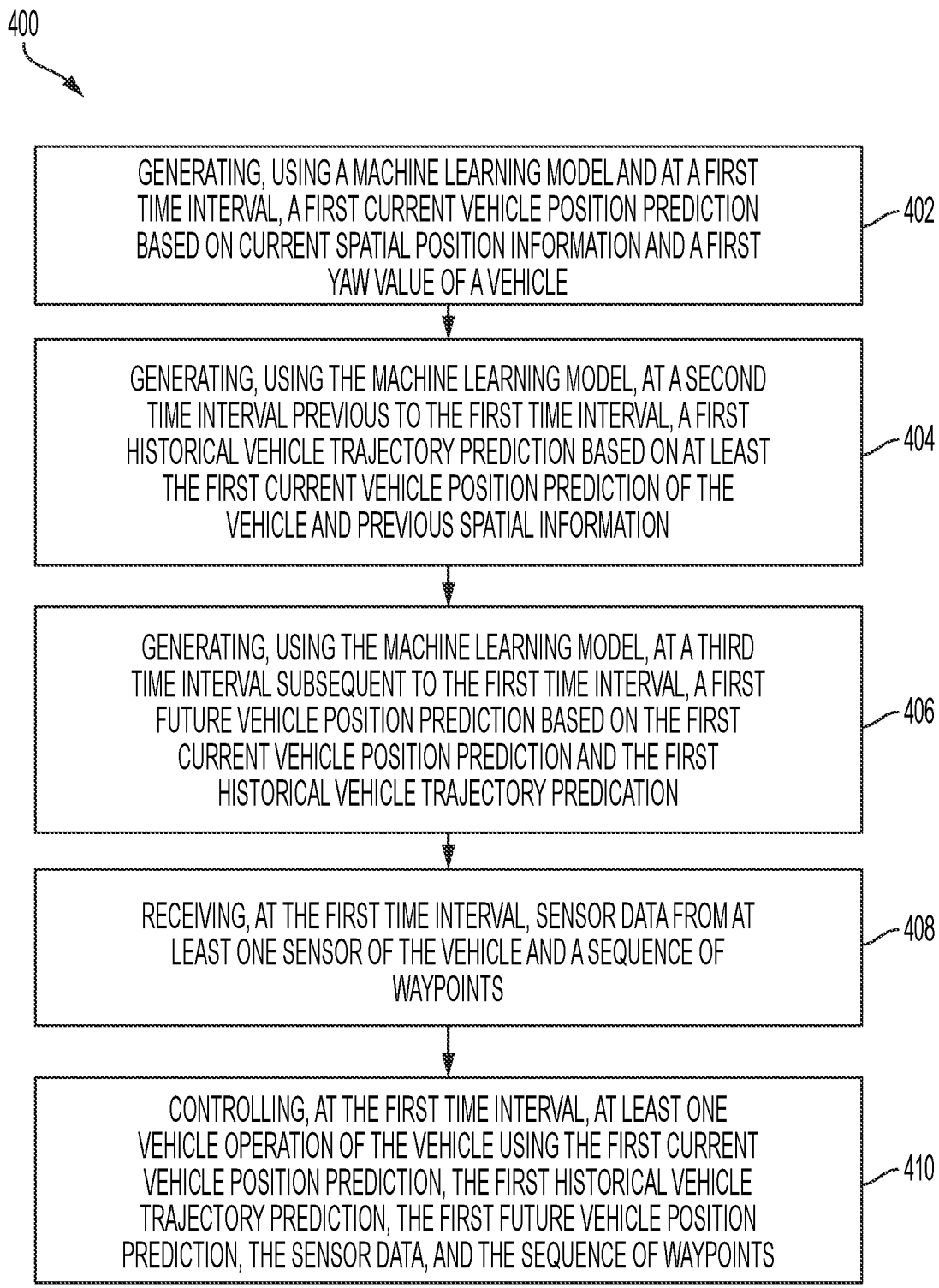
FIG. 4 is a flow diagram generally illustrating an autonomous vehicle control method, according to the principles of the present disclosure.

FIG. 4 is a flow diagram generally illustrating an autonomous vehicle control method 400 according to the principles of the present disclosure. At 402, the method 400 generates, using a machine learning model and at a first time interval, a first current vehicle position prediction based on current spatial position information and a first yaw value of a vehicle. For example, the system 200 may generate, using the machine learning model 210 and at the first time interval, the first current vehicle position prediction based on the current spatial position information and the first yaw value of the vehicle.

At 404, the method 400 generates, using the machine learning model, at a second time interval previous to the first time interval, a first historical vehicle trajectory prediction based on at least the first current vehicle position prediction of the vehicle and previous spatial information. For example, the system 200 may generate, using the machine learning model 210, at the second time interval previous to the first time interval, the first historical vehicle trajectory prediction based on at least the first current vehicle position prediction of the vehicle and the previous spatial information.

At 406, the method 400 generates, using the machine learning model, at a third time interval subsequent to the first time interval, a first future vehicle position prediction based on the first current vehicle position prediction and the first historical vehicle trajectory predication. For example, the system 200 may generate, using the machine learning model 210, at the third time interval subsequent to the first time interval, the first future vehicle position prediction based on the first current vehicle position prediction and the first historical vehicle trajectory predication.

At 408, the method 400 receives, at the first time interval, sensor data from at least one sensor of the vehicle and a sequence of waypoints. For example, the system 200 may receive, at the first time interval, the sensor data from the at least one sensor of the vehicle and the sequence of waypoints.

At 410, the method 400 controls, at the first time interval, at least one vehicle operation of the vehicle using the first current vehicle position prediction, the first historical vehicle trajectory prediction, the first future vehicle position prediction, the sensor data, and the sequence of waypoints. For example, the system 200 may control, at the first time interval, the at least one vehicle operation of the vehicle using the first current vehicle position prediction, the first historical vehicle trajectory prediction, the first future vehicle position prediction, the sensor data, and the sequence of waypoints.

Figure 5:
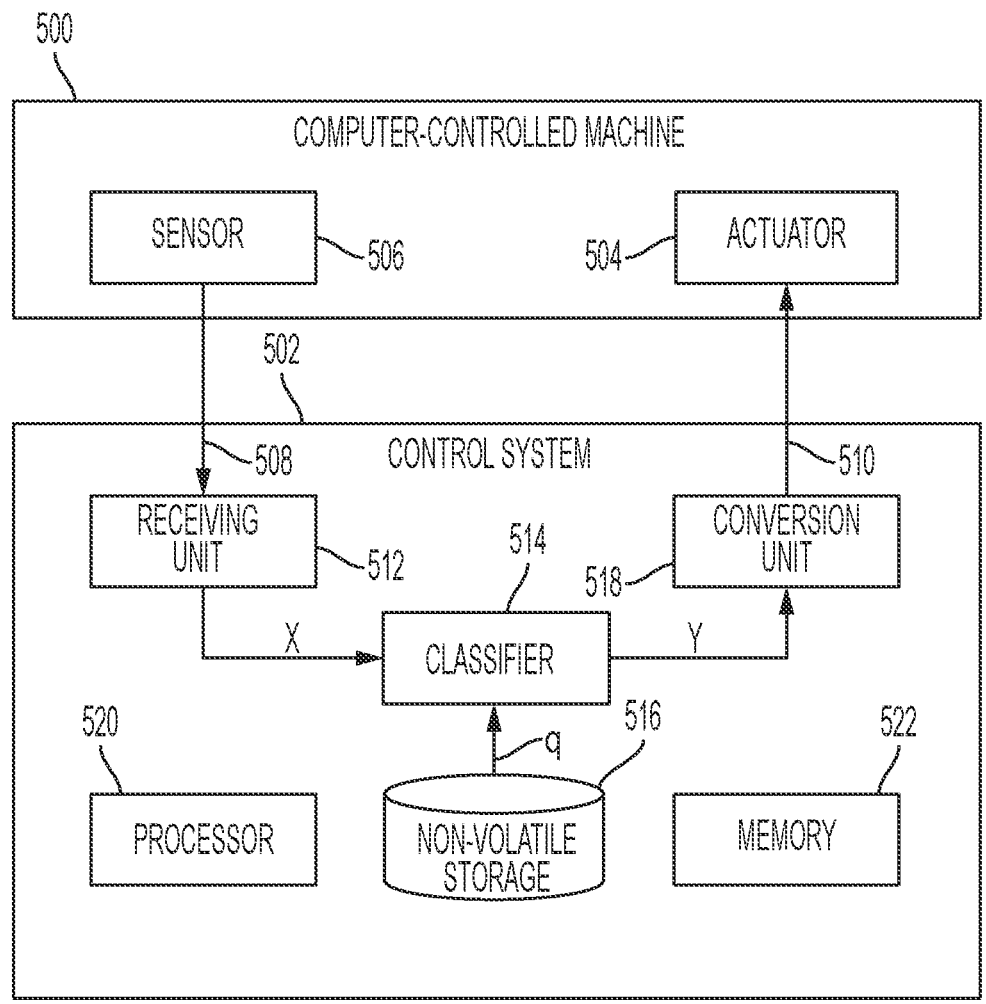
FIG. 5 depicts a schematic diagram of an interaction between a computer-controlled machine and a control system, according to the principles of the present disclosure.

FIG. 5 depicts a schematic diagram of an interaction between computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In some embodiments, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes classifier 514. Classifier 514 may be configured to classify input signals x into one or more labels using a machine-learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
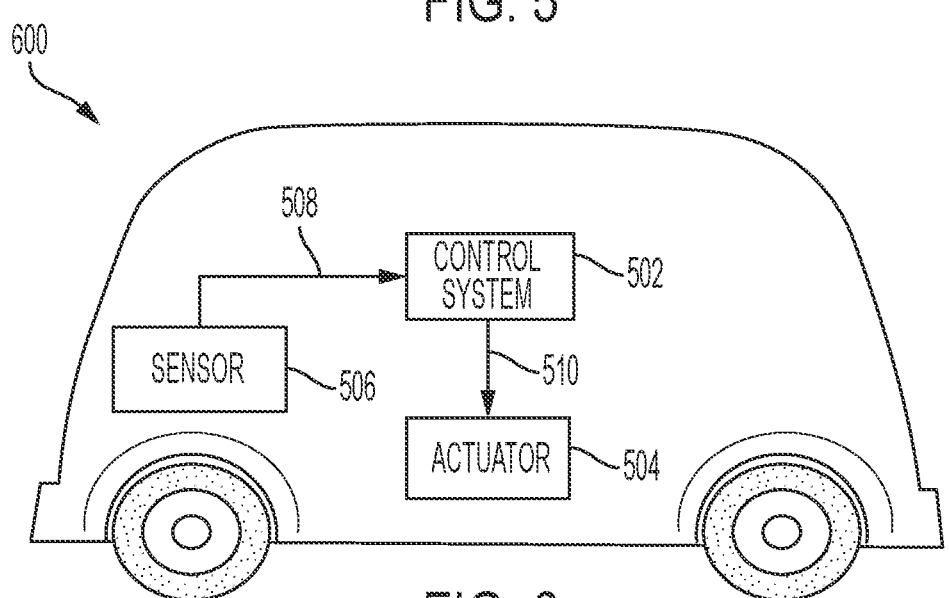
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to the principles of the present disclosure.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In some embodiments, the vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In some embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In some embodiments, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
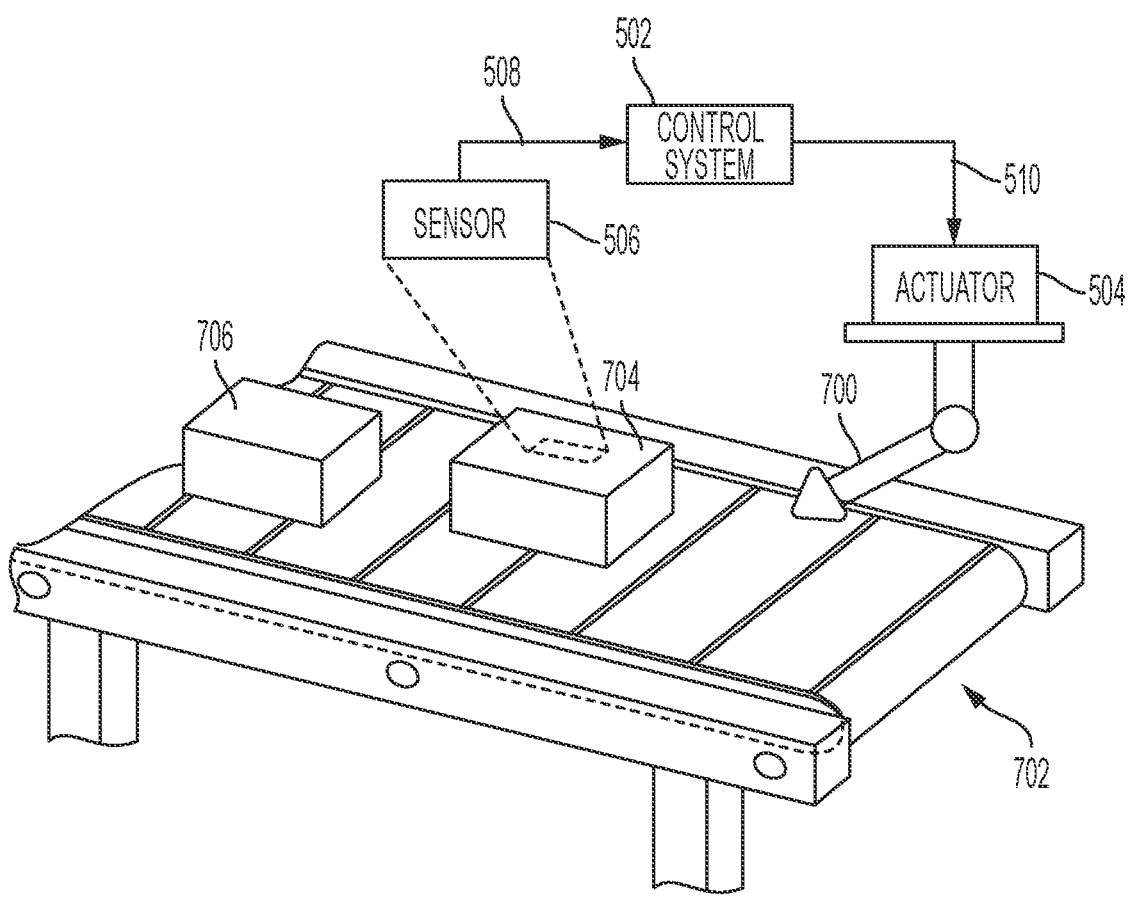
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
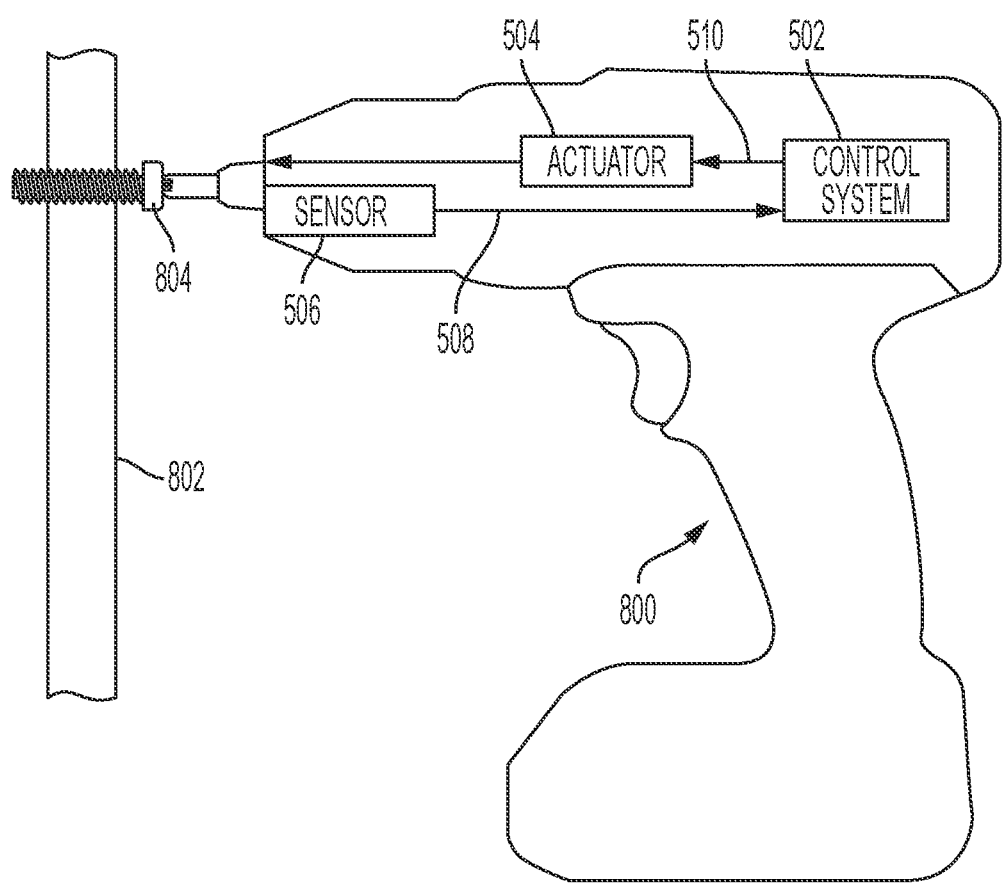
FIG. 8 depicts a schematic diagram of the control system of FIG. 5 configured to control a power tool, such as a power drill or driver that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
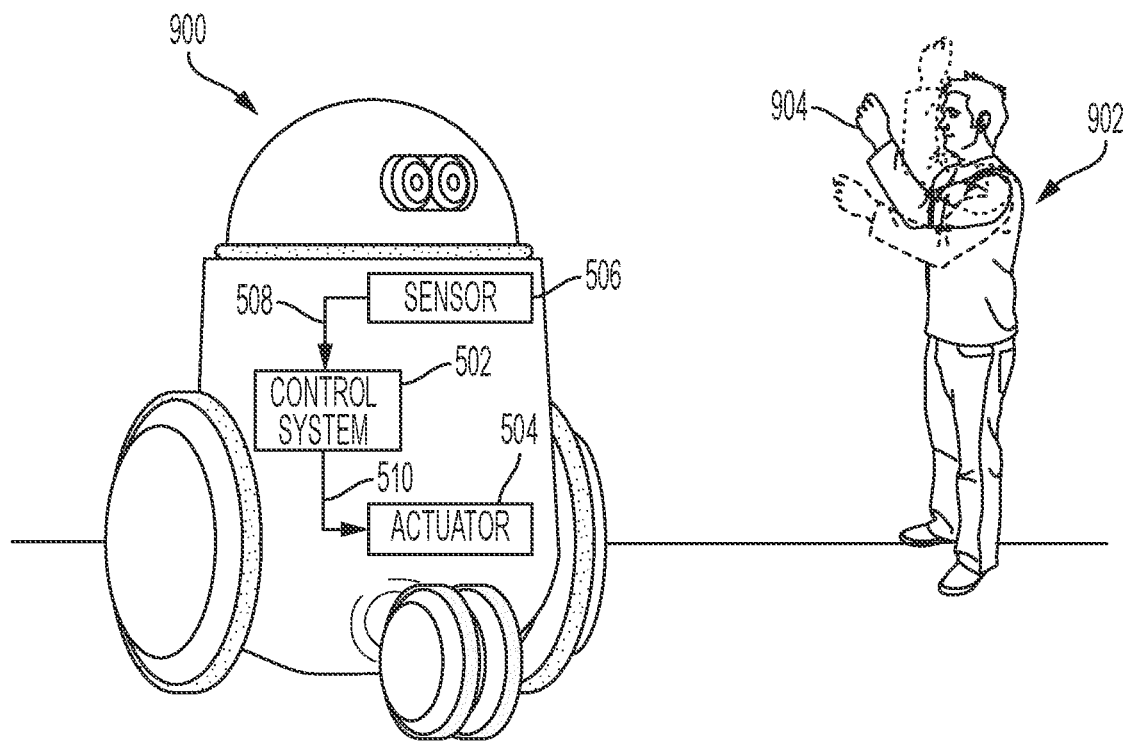
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
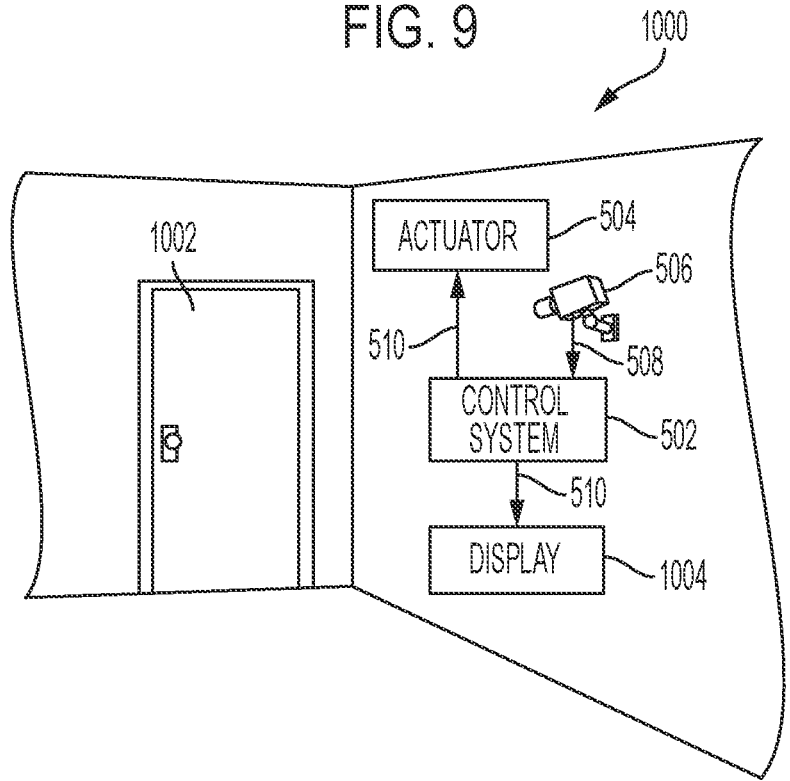
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
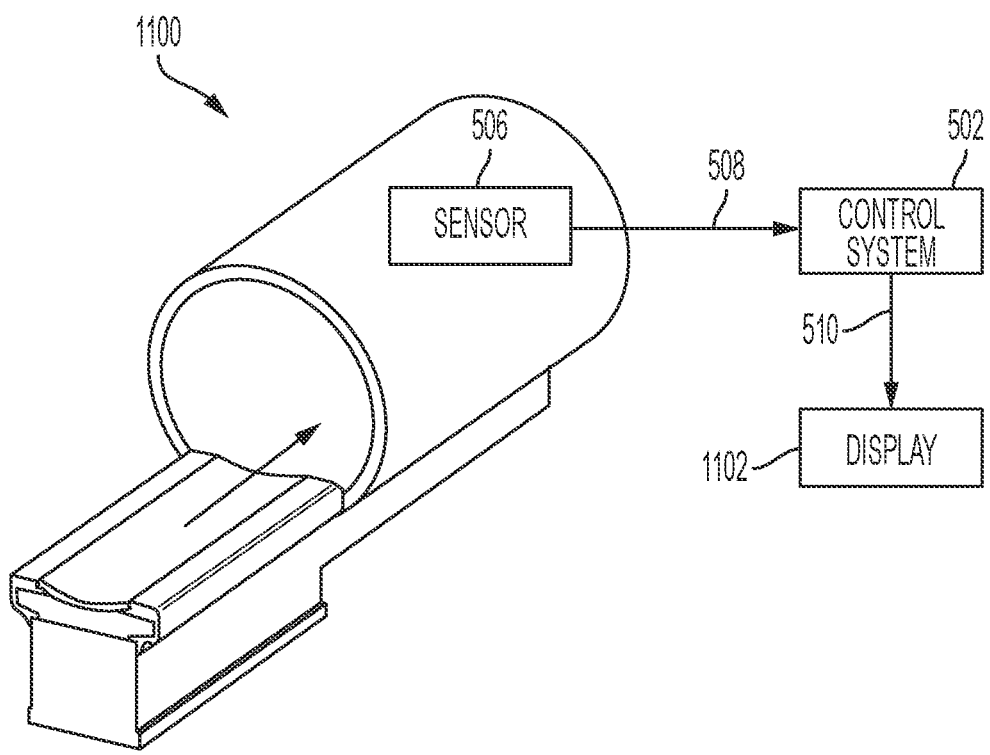
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

In some embodiments, a method for autonomous vehicle control includes generating, using a machine learning model and at a first time interval, a first current vehicle position prediction based on current spatial position information and a first yaw value of a vehicle. The method also includes generating, using the machine learning model, at a second time interval previous to the first time interval, a first historical vehicle trajectory prediction based on at least the first current vehicle position prediction of the vehicle and previous spatial information. The method also includes generating, using the machine learning model, at a third time interval subsequent to the first time interval, a first future vehicle position prediction based on the first current vehicle position prediction and the first historical vehicle trajectory predication. The method also includes receiving, at the first time interval, sensor data from at least one sensor of the vehicle and a sequence of waypoints, and controlling, at the first time interval, at least one vehicle operation of the vehicle using the first current vehicle position prediction, the first historical vehicle trajectory prediction, the first future vehicle position prediction, the sensor data, and the sequence of waypoints.

In some embodiments, the machine learning model is initially trained using training data that includes vehicle operation data corresponding to operation of one or more vehicles. In some embodiments, the method also includes updating historical data using the first current vehicle position prediction, the first historical vehicle trajectory prediction, and the first future vehicle position prediction. In some embodiments, the method also includes pruning the historical data based on feedback responsive to the first current vehicle position prediction, the first historical vehicle trajectory prediction, and the first future vehicle position prediction. In some embodiments, the machine learning model is subsequently trained using the historical data. In some embodiments, the sensor data includes one or more images corresponding to an operating environment of the vehicle. In some embodiments, the method also includes receiving, at the third time interval, subsequent sensor data from the at least one sensor of the vehicle and a subsequent sequence of waypoints. In some embodiments, the method also includes generating, using the machine learning model and at the third time interval, a second current vehicle position prediction based on subsequent spatial position information and a second yaw value of the vehicle, generating, using the machine learning model, at a fourth time interval previous to the third time interval, a second historical vehicle trajectory prediction based on at least the second current vehicle position prediction of the vehicle and previous spatial information, and generating, using the machine learning model, at a fifth time interval subsequent to the third time interval, a second future vehicle position prediction based on the second current vehicle position prediction and the second historical vehicle trajectory predication. In some embodiments, the method also includes controlling, at the third time interval, the at least one vehicle operation of the vehicle using the second current vehicle position prediction, the second historical vehicle trajectory prediction, the second future vehicle position prediction, the subsequent sensor data, and the sequence of waypoints.

In some embodiments, a system for autonomous vehicle control includes a processor and a memory. The memory includes instructions that, when executed by the processor, cause the processor to: generate, using a machine learning model and at a first time interval, a first current vehicle position prediction based on current spatial position information and a first yaw value of a vehicle; generate, using the machine learning model, at a second time interval previous to the first time interval, a first historical vehicle trajectory prediction based on at least the first current vehicle position prediction of the vehicle and previous spatial information; generate, using the machine learning model, at a third time interval subsequent to the first time interval, a first future vehicle position prediction based on the first current vehicle position prediction and the first historical vehicle trajectory predication; receive, at the first time interval, sensor data from at least one sensor of the vehicle and a sequence of waypoints; and generate, at the first time interval, at least one vehicle operation command for controlling at least one vehicle operation of the vehicle, wherein the at least one vehicle operation command is generated based on the first current vehicle position prediction, the first historical vehicle trajectory prediction, the first future vehicle position prediction, the sensor data, and the sequence of waypoints.

In some embodiments, the machine learning model is initially trained using training data that includes vehicle operation data corresponding to operation of one or more vehicles. In some embodiments, the instructions further cause the processor to update historical data using the first current vehicle position prediction, the first historical vehicle trajectory prediction, the first future vehicle position prediction, and the at least one vehicle operation command. In some embodiments, the instructions further cause the processor to prune the historical data based on feedback responsive to the first current vehicle position prediction, the first historical vehicle trajectory prediction, and the first future vehicle position prediction. In some embodiments, the machine learning model is subsequently trained using the historical data. In some embodiments, the sensor data includes one or more images corresponding to an operating environment of the vehicle. In some embodiments, the instructions further cause the processor to receive, at the third time interval, subsequent sensor data from the at least one sensor of the vehicle and a subsequent sequence of waypoints. In some embodiments, the instructions further cause the processor to: generate, using the machine learning model and at the third time interval, a second current vehicle position prediction based on subsequent spatial position information and a second yaw value of the vehicle; generate, using the machine learning model, at a fourth time interval previous to the third time interval, a second historical vehicle trajectory prediction based on at least the second current vehicle position prediction of the vehicle and previous spatial information; and generate, using the machine learning model, at a fifth time interval subsequent to the third time interval, a second future vehicle position prediction based on the second current vehicle position prediction and the second historical vehicle trajectory predication. In some embodiments, the instructions further cause the processor to control, at the third time interval, the at least one vehicle operation of the vehicle using the second current vehicle position prediction, the second historical vehicle trajectory prediction, the second future vehicle position prediction, the subsequent sensor data, and the sequence of waypoints.

In some embodiments, an apparatus for modular machine learning decision making includes a processor and a memory including instructions that, when executed by the processor, cause the processor to: generate, using a machine learning model and at a first time interval, a first current position prediction of an autonomously controlled machine based on at least current spatial position information of the autonomously controlled machine; generate, using the machine learning model, at a second time interval previous to the first time interval, a first historical trajectory prediction of the autonomously controlled machine based on at least the first current position prediction and previous spatial information; generate, using the machine learning model, at a third time interval subsequent to the first time interval, a first future position prediction of the autonomously controlled machine based on the first current position prediction and the first historical trajectory predication; receive, at the first time interval, sensor data from at least one sensor of the autonomously controlled machine and a sequence of waypoints; and generate, at the first time interval, at least one operation command for controlling at least one operation of the autonomously controlled machine, wherein the at least one operation command is generated based on the first current position prediction, the first historical trajectory prediction, the first future position prediction, the sensor data, and the sequence of waypoints.

In some embodiments, the instructions further cause the processor to update historical data using the first current position prediction, the first historical trajectory prediction, the first future position prediction, and the at least one operation command.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for autonomous vehicle control, the method comprising:
    generating, using a machine learning model, a first current vehicle position prediction based on current spatial position information and a first yaw value of a vehicle;
    generating, using the machine learning model a first historical vehicle trajectory prediction based on at least the first current vehicle position prediction of the vehicle and previous spatial information;
    generating, using the machine learning model, a first future vehicle position prediction based on the first current vehicle position prediction and the first historical vehicle trajectory predication;
    receiving sensor data from at least one sensor of the vehicle and a sequence of waypoints;
    generating a plurality of observations based on the sensor data and the sequence of waypoints;
    generating an embedding vector for each observation of the plurality of observations;
    controlling at least one vehicle operation of the vehicle using the first current vehicle position prediction, the first historical vehicle trajectory prediction, the first future vehicle position prediction, the plurality of observations, and the embedding vector for each observation;
    updating historical data using the first current vehicle position prediction, the first historical vehicle trajectory prediction, and the first future vehicle position prediction;
    pruning the historical data by scoring trajectory data associated with the historical data and selecting trajectories based on the scored trajectory data; and
    subsequently training the machine learning model using the historical data.

2. The method of claim 1, wherein the machine learning model is initially trained using training data that includes vehicle operation data corresponding to operation of one or more vehicles.

3. The method of claim 1, wherein the sensor data includes one or more images corresponding to an operating environment of the vehicle.

4. The method of claim 1, further comprising receiving subsequent sensor data from the at least one sensor of the vehicle and a subsequent sequence of waypoints.

5. The method of claim 4, further comprising:
    generating, using the machine learning model a second current vehicle position prediction based on subsequent spatial position information and a second yaw value of the vehicle;
    generating, using the machine learning model a second historical vehicle trajectory prediction based on at least the second current vehicle position prediction of the vehicle and previous spatial information; and
    generating, using the machine learning model a second future vehicle position prediction based on the second current vehicle position prediction and the second historical vehicle trajectory predication.

6. The method of claim 5, further comprising controlling the at least one vehicle operation of the vehicle using the second current vehicle position prediction, the second historical vehicle trajectory prediction, the second future vehicle position prediction, the subsequent sensor data, and the subsequent sequence of waypoints.

7. A system for autonomous vehicle control, the system comprising:
    a processor; and
    a memory including instructions that, when executed by the processor, cause the processor to:
    generate, using a machine learning model a first current vehicle position prediction based on current spatial position information and a first yaw value of a vehicle;
    generate, using the machine learning model, a first historical vehicle trajectory prediction based on at least the first current vehicle position prediction of the vehicle and previous spatial information;

generate, using the machine learning model a first future vehicle position prediction based on the first current vehicle position prediction and the first historical vehicle trajectory predication;

receive sensor data from at least one sensor of the vehicle and a sequence of waypoints;

generate a plurality of observations based on the sensor data and the sequence of waypoints;

generate an embedding vector for each observation of the plurality of observations;

generate at least one vehicle operation command for controlling at least one vehicle operation of the vehicle, wherein the at least one vehicle operation command is generated based on the first current vehicle position prediction, the first historical vehicle trajectory prediction, the first future vehicle position prediction, the plurality of observations, and the embedding vector for each observation;

update historical data using the first current vehicle position prediction, the first historical vehicle trajectory prediction, and the first future vehicle position prediction;

prune the historical data by scoring trajectory data associated with the historical data and selecting trajectories based on the scored trajectory data; and subsequently train the machine learning model using the historical data.

8. The system of claim 7, wherein the machine learning model is initially trained using training data that includes vehicle operation data corresponding to operation of one or more vehicles.

9. The system of claim 7, wherein the sensor data includes one or more images corresponding to an operating environment of the vehicle.

10. The system of claim 7, wherein the instructions further cause the processor to receive subsequent sensor data from the at least one sensor of the vehicle and a subsequent sequence of waypoints.

11. The system of claim 10, wherein the instructions further cause the processor to:

generate, using the machine learning model a second current vehicle position prediction based on subsequent spatial position information and a second yaw value of the vehicle;

generate, using the machine learning model a second historical vehicle trajectory prediction based on at least the second current vehicle position prediction of the vehicle and previous spatial information; and generate, using the machine learning model a second future vehicle position prediction based on the second current vehicle position prediction and the second historical vehicle trajectory predication.

12. The system of claim 11, wherein the instructions further cause the processor to control the at least one vehicle operation of the vehicle using the second current vehicle position prediction, the second historical vehicle trajectory prediction, the second future vehicle position prediction, the subsequent sensor data, and the subsequent sequence of waypoints.

13. An apparatus for modular machine learning decision making, the apparatus comprising:

a processor; and a memory including instructions that, when executed by the processor, cause the processor to:

generate, using a machine learning model a first current position prediction of an autonomously controlled machine based on at least current spatial position information of the autonomously controlled machine;

generate, using the machine learning model a first historical trajectory prediction of the autonomously controlled machine based on at least the first current position prediction and previous spatial information;

generate, using the machine learning model a first future position prediction of the autonomously controlled machine based on the first current position prediction and the first historical trajectory predication;

receive sensor data from at least one sensor of the autonomously controlled machine and a sequence of waypoints;

generate a plurality of observations based on the sensor data and the sequence of waypoints;

generate an embedding vector for each observation of the plurality of observations;

generate at least one operation command for controlling at least one operation of the autonomously controlled machine, wherein the at least one operation command is generated based on the first current position prediction, the first historical trajectory prediction, the first future position prediction, the plurality of observations, and the embedding vector for each observation;

update historical data using the first current vehicle position prediction, the first historical vehicle trajectory prediction, and the first future vehicle position prediction;

prune the historical data by scoring trajectory data associated with the historical data and selecting trajectories based on the scored trajectory data; and subsequently train the machine learning model using the historical data.

* * * * *